United States Patent [19]
Lamb et al.

[11] Patent Number: 5,863,857
[45] Date of Patent: Jan. 26, 1999

[54] ADSORBENT CONTAINING COMPOSITION FOR USE IN INSULATING GLASS UNITS

[75] Inventors: Kathleen Louise Lamb; Brian Jonathan Briddell, both of Jackson, Mich.

[73] Assignee: Adco Products, Inc., Michigan Center, Mich.

[21] Appl. No.: 669,139

[22] Filed: Jun. 24, 1996

[51] Int. Cl.[6] .............................. B01J 20/26; C08J 27/00; B32B 17/00
[52] U.S. Cl. .......................... 502/402; 524/528; 156/107
[58] Field of Search ................................. 504/401, 402; 156/107, 109

[56] References Cited

U.S. PATENT DOCUMENTS

| | | |
|---|---|---|
| 3,791,910 | 2/1974 | Bowser . |
| 3,832,254 | 8/1974 | Bowser et al. . |
| 3,965,215 | 6/1976 | Lopez et al. . |
| 4,045,401 | 8/1977 | Stenmark et al. . |
| 4,109,431 | 8/1978 | Mazzoni et al. . |
| 4,197,381 | 4/1980 | Alia . |
| 4,198,254 | 4/1980 | Laroche et al. . |
| 4,226,063 | 10/1980 | Chenel . |
| 4,431,691 | 2/1984 | Greenlee . |
| 4,622,249 | 11/1986 | Bowser . |
| 4,745,711 | 5/1988 | Box . |
| 4,835,130 | 5/1989 | Box . |
| 4,994,309 | 2/1991 | Reichert et al. . |
| 5,120,374 | 6/1992 | Noda et al. . |
| 5,169,890 | 12/1992 | Eadara et al. . |
| 5,177,916 | 1/1993 | Misera et al. . |
| 5,204,390 | 4/1993 | Szymanski et al. . |
| 5,255,481 | 10/1993 | Misera et al. . |
| 5,270,091 | 12/1993 | Krysiak et al. . |
| 5,351,451 | 10/1994 | Misera et al. . |
| 5,420,182 | 5/1995 | Chang et al. . |
| 5,424,135 | 6/1995 | Murata et al. . |
| 5,501,013 | 3/1996 | Misera et al. . |
| 5,503,884 | 4/1996 | Meyer et al. ........................ 428/34 |
| 5,509,984 | 4/1996 | Meyer et al. ....................... 156/107 |
| 5,510,416 | 4/1996 | Meyer et al. ....................... 524/528 |

FOREIGN PATENT DOCUMENTS

| | | |
|---|---|---|
| 475213 | 3/1992 | European Pat. Off. . |
| 2394728 | 1/1979 | France . |
| 2113453 | 8/1983 | United Kingdom . |

OTHER PUBLICATIONS

Wilson, "Closing the Gaps in Window Efficiency", *Popular Science*, Aug. 1992 p. 46.
Edgetech Technical Report, "Super Spacer™", Sep. 1989.
Courtaulds Aerospace brochure, PRC 525DM Dessicated Matrix, Jul. 1993.
W.R. Grace & Co. brochure, Phonosorb MTX P–350 Dessicant Matrix, 1994.

*Primary Examiner*—Michael Lewis
*Assistant Examiner*—Tanaga Anne Boozer
*Attorney, Agent, or Firm*—Colleen D. Szuch; Jay P. Friedenson

[57] ABSTRACT

An adsorbent containing composition for use in an insulating glass unit is provided. The composition includes a depolymerized butyl rubber having a low viscosity average molecular weight which is a carrier for moisture and volatile organic chemical adsorbing materials. The composition is economical to produce and results in a composition which effectively desiccates a sealed insulating glass unit without the problem of chemical fogging.

11 Claims, 1 Drawing Sheet

ADSORBENT CONTAINING COMPOSITION FOR USE IN INSULATING GLASS UNITS

The present invention relates to an adsorbent containing composition for use in insulating glass units, and more particularly, to an adsorbent containing composition utilizing a depolymerized butyl rubber which reduces chemical fogging between glass sheets and which is economical to produce.

BACKGROUND OF THE INVENTION

It is well known that an important part of window manufacturing is the insulating glass unit. The insulating glass unit generally comprises two pieces of glass and a spacer which is bonded between the glass to create a transparent, insulating air space which reduces the heat transfer between the outside and the inside of a home or other structure. The spacer is typically of a hollow rectangular metal which may contain moisture and volatile organic chemical adsorbents which function to desiccate the interior space of the sealed insulating glass unit. The perimeter of the unit is generally sealed with a sealant such as a hot applied pumpable butyl sealant, one-part or two-part urethane sealants, and silicone or polysulfide sealants.

In recent years, the assembly of insulating glass units has become automated. For example, spacers are filled with the moisture and/or volatile organic chemical adsorbents by automatic dispensing equipment. Linear corner keys are inserted into each spacer at specific intervals which facilitates forming of the linear spacer assembly into a rectangular shape. The application of hot sealants such as hot applied pumpable butyl sealants may be achieved by a continuous on-line application system in which the butyl sealant is heated and applied using a heated pumping system to three sides of the spacer. The spacer is then folded via the corner keys to form a rectangle which is sandwiched between the two glass sheets to form the sealed insulating unit. The assembled unit is then re-heated and compressed as it passes through a finishing oven to seal the unit against moisture. However, the use of corner keys to join non-continuous spacers has been known to make the insulating glass unit vulnerable to moisture intrusion.

An alternative spacer frame for an insulating glass unit is described in U.S. Pat. No. 5,177,916, which is marketed by PPG Industries, Inc. under the designation INTERCEPT™. The unit utilizes a one-piece, U-shaped metal spacer between glass sheets. The spacer is notched to allow the spacer to be bent into a rectangular shape, which eliminates the need for corner keys. The spacer frame design provides improved moisture and gas impermeability and thermal efficiency. However, because of the design of the U-shaped channel, the moisture and chemical adsorbents must be incorporated in a mastic composition which is applied to the inner bottom surface of the U-channel. Further, the composition must be able to be dispensed using conventional pumping systems.

The composition must also contain sufficient moisture adsorbent to desiccate the interior air space of the sealed insulating glass unit effectively over the life of the unit. Further, the composition should not contribute to chemical "fogging", which is an unsightly accumulation of volatile organic chemicals that deposits on interior surfaces of the glass sheets. Such fogging can be caused by volatiles from the sealants, or volatiles from other structures in the interior of the glass assembly such as painted decorative grids.

One known mastic composition which is designed for use with the Intercept™ system is described in Meyer et al, U.S. Pat. No. 5,310,416. The composition contains polyisobutylene, amorphous polypropylene, tackifiers, and moisture and volatile organic chemical adsorbing materials. However, while such a composition is effective in keeping the air space dry and reducing chemical fogging, the composition is expensive to manufacture due to the high cost of polyisobutylene, which comprises up to 30% of the composition.

Accordingly, there is still a need in the art for an adsorbent containing composition which may be used in insulating glass units which is economical to produce, which effectively desiccates the space in the-unit, and which does not contribute to chemical fogging.

SUMMARY OF THE INVENTION

The present invention meets that need by providing an adsorbent containing composition which utilizes a depolymerized butyl rubber as the carrier material for the adsorbent materials. The depolymerized butyl rubber is inexpensive to use and is low in viscosity so as to permit the use of high levels of the adsorbent materials. As a result, the composition is pumpable and effectively desiccates the interior window air space over the life of the insulating glass unit. The composition exhibits less chemical fogging than compositions based on low molecular weight polyisobutylenes. In addition, the composition does not sag and retains its adhesion over the temperature range of −40° to 88° C.

According to one aspect of the present invention, an adsorbent containing composition for use in an insulating glass unit is provided comprising from about 8–50% by weight of a depolymerized butyl rubber, from about 0–42% by weight of a noncrystalline polyolefin, from about 20–50% by weight of a moisture adsorbent, and from about 0.5–10% by weight of a volatile organic chemical adsorbent.

By depolymerized, it is meant that the butyl rubber polymer has been reduced in both molecular weight and viscosity. Preferably, the depolymerized butyl rubber is prepared from a butyl rubber polymer having a viscosity average molecular weight of from about 350,000 to 450,000. After depolymerization, the butyl rubber has a preferred viscosity average molecular weight of from about 30,000 to 80,000.

The noncrystalline polyolefin in the composition is added to lower the viscosity of the composition and is preferably selected from the group consisting of amorphous propylene homopolymers, copolymers of ethylene and propylene, copolymers of butene and propylene, and terpolymers of ethylene, propylene and butene.

The moisture adsorbent may be any suitable moisture adsorbing material and is preferably selected from the group consisting of molecular sieves, silica gel, silica magnesia gel, silica alumina gel, activated carbon, calcium oxide, and natural zeolites. The volatile organic chemical adsorbent is preferably selected from the group consisting of molecular sieves, activated carbon, and silica gel.

The composition preferably further includes from about 0.2% to 0.5% by weight of an antioxidant, which functions to provide the composition with UV light and heat stability. The composition may also include from about 0.1% to 0.5% by weight of a pigment additive such as carbon black or titanium oxide.

The composition of the present invention is of a suitable viscosity for dispensing through conventional pumping systems at sufficient application rates to meet production build rates required by window manufacturers. The viscosity, as measured by ASTM D2452 at 88° C., is less than 60 seconds and preferably in the range of 5–25 seconds.

Accordingly, it is a feature of the invention to provide an adsorbent containing composition utilizing a depolymerized butyl rubber having a low viscosity which is economical to produce, and to a composition which effectively desiccates an insulating glass unit, and which reduces chemical fogging.

This, and other features and advantages of the present invention will become apparent from the following detailed description, the accompanying drawing, and the appended claims.

DETAILED DESCRIPTION OF THE PREFERRED EMBODIMENT

Figure 1:
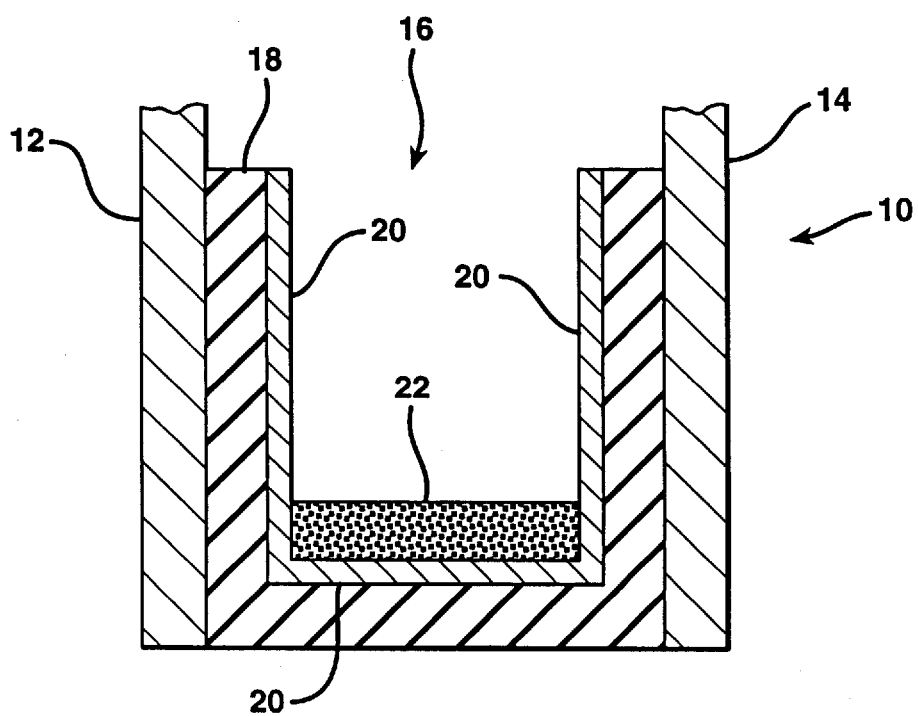
FIG. 1 is a sectional view of an insulating glass unit utilizing the adsorbent containing composition of the present invention.

By utilizing a depolymerized butyl in the composition of the present invention, the resulting composition has excellent weathering characteristics. The composition also produces less chemical fog than and is more economical to produce than prior art compositions utilizing polyisobutylene.

Referring now to FIG. 1, an insulating glass unit 10 is shown including glass sheets 12 and 14 providing an interior air space 16. An insulating glass perimeter sealant 18 is also included which adheres the glass sheets to a U-shaped metal spacer 20. As shown, the adsorbent containing composition of the present invention 22 is applied to the inner surface of the U-shaped spacer to adsorb moisture and any volatile organic compounds in the air space 16.

The butyl rubber polymer used as a starting material in the present invention is a copolymer produced by the ionic polymerization of isobutylene and isoprene. A preferred class of butyl rubber polymer is commercially available from Exxon Chemical Company under the designations Butyl 065, 165, 365, 268, 269 and from Bayer under the designations Butyl 100, 101-3, and 301. The preferred rubber grades are Exxon Butyl 065 or Bayer Butyl 100, which contain low mole percent unsaturation.

In order for the butyl polymer to be a suitable carrier for the moisture and volatile organic chemical adsorbing materials, it must first be reduced in viscosity. In the present invention, this is preferably achieved by a depolymerization reaction in which the butyl rubber polymer is subjected to mechanical shear mixing in the presence of a peptizing or depolymerizing agent followed by termination of the reaction with the addition of an antioxidant. Other known butyl rubber depolymerization processes may also be used. Suitable shear mixers for use in the invention include Sigma Blade or Banbury mixers with heating capability.

Suitable peptizing agents include peroxides and organic metal complexes. Preferred peptizing agents are peroxides such as $\alpha,\alpha'$-bis(tertbutylperoxy)diisopropylbenzene, available from Hercules under the trade name Vulcup R.

The antioxidant used to terminate the reaction may be a hindered phenol, an organic phosphite, or a blend of each. A preferred hindered phenol antioxidant is Irganox 1010, available from Ciba Geigy. A preferred organic phosphate antioxidant is Irgofos 168, available from Ciba Geigy.

The preferred depolymerization process includes introducing the butyl polymer into a Sigma Blade mixer, adding a peptizing agent, and adjusting the temperature to between about 160° C. to 190° C. The rubber is sheared for 2 to 3 hours or until the viscosity reaches the desired level. A depolymerized butyl rubber having a viscosity average molecular weight (as defined by *Rubber Chemistry and Technology*, pages 1479–1482) of between about 30,000 to 80,000 is most preferred.

The butyl rubber of the present invention is preferably prepared by the depolymerization reaction described above for economic reasons. However, other commercially available depolymerized butyl rubbers may be used. Suitable depolymerized butyl rubbers are available from Hardman, a division of Harcros Chemicals, Inc. under the designations Kalene® 800 and Kalene® 1300.

The antioxidant is then added to scavenge any remaining peroxide and terminate the reaction. It should be appreciated that the viscosity of the butyl rubber may be controlled by adjusting the mix time, temperature, and level of peptizing agent. The viscosity of the resulting depolymerized butyl can be measured by a penetrometer as described in ASTM D217. Alternatively, the viscosity may be measured with the use of a dynamic mechanical analyzer (DMA), which gives a rheological profile of the butyl polymer, or with the use of gel permeation chromatography (GPC) to provide a molecular weight profile. The resulting depolymerized butyl preferably comprises 90–99 weight % butyl polymer, 0.5–9.5 weight e peptizing agent, and 0.5–9.5 weight % of an antioxidant.

The moisture adsorbent included in the composition is preferably selected from the group consisting of molecular sieves, silica gel, silica magnesia gel, silica alumina gel, activated carbon, calcium oxide, and natural zeolites. A preferred moisture adsorbent is Molsiv 3A available from UOP.

The volatile organic chemical adsorbent is preferably selected from the group consisting of molecular sieves, activated carbon, and silica gel. A preferred volatile organic chemical adsorbing material is Molsiv 13X available from UOP.

It is preferred that the total adsorbent level of the composition be no less than 50 weight % of the total composition to ensure sufficient desiccation over the life of the insulating glass unit. However, adsorbent levels of between 20 to 50% by weight may be suitable in other uses for the composition. The remainder of the composition may be composed of the depolymerized butyl rubber or a combination of the depolymerized butyl rubber and other materials and additives.

The composition preferably includes a noncrystalline amorphous polyolefin such as polypropylene, which is added to lower the viscosity of the composition and to facilitate pumping at elevated temperatures. Suitable polyolefins include Eastoflex M1030, an ethylene-propylene copolymer, and Eastoflex P1023, a polypropylene homopolymer, both available from Eastman Chemical Co. Other suitable polyolefins include Rextac RT-1330, an ethylene-propylene copolymer; Rextac RT-2180, a polypropylene homopolymer; Rextac RT-2730, a butene-propylene copolymer; and Rextac RT-2535, an ethylene-propylene copolymer; all available from Rexene Products.

Antioxidants are also preferably included in the composition to provide UV light and heat stability to which the insulating glass unit is exposed during its lifetime. Suitable antioxidants include hindered phenols and organic phosphates. A suitable hindered phenol is Irganox 1010 available from Ciba Geigy, and a suitable organic phosphite is Irgofos 168 available from Ciba Geigy.

Hydrocarbon resins or high molecular weight polybutenes may also be utilized in small concentrations as tackifiers, but should be screened for fogging prior to use.

In order that the invention may be more readily understood, reference is made to the following examples, which are intended to be illustrative of the invention, but are not intended to be limiting in scope.

EXAMPLE 1

Three adsorbent containing compositions were prepared using varying levels of depolymerized butyl rubber, amorphous polyolefins, and adsorbents. The depolymerized butyl rubber was prepared from Exxon butyl 065 and shear mixed using a Sigma blade mixer at a temperature range of from about 160° C. to 190° C. A peptizing agent was added and the reaction terminated with the addition of an antioxidant. A penetrometer as described in ASTM D217 was used to give a reading of the penetration hardness of the butyl. This measurement was 10.0 to 14.0 mm, which corresponds to the viscosity and molecular weight change in the butyl and also indicates the completion of the depolymerization reaction.

The weight percentage of the components in each composition is shown below in Table 1, along with the moisture adsorbing capacity (calculated based on the known moisture capacity of the adsorbents).

TABLE 1

| | (% by weight) | | | | |
|---|---|---|---|---|---|
| | Comparative Examples | | Invention Examples | | |
| Components | A | B | C | D | E |
| Depolym. butyl rubber | 5 | 27 | 8 | 39 | 19 |
| amorphous polypropylene[1] | 44 | 57 | 0 | 10 | 30 |
| amorphous polypropylene[2] | 0 | 0 | 42 | 0 | 0 |
| antioxidant[3] | 0.5 | 0.5 | 0.5 | 0.5 | 0.5 |
| moisture adsorbent[4] | 45 | 15 | 45 | 45 | 45 |
| organic volatile[5] adsorbent | 5 | 0 | 5 | 5 | 5 |
| carbon black | 0.5 | 0.5 | 0.5 | 0.5 | 0.5 |
| Moisture Capacity (weight %) | 12.2 | 3.45 | 12.2 | 12.2 | 12.2 |
| Flexibility at −29° C. | brittle | flex. | flex. | flex. | flex. |

[1]Rextac 2730 from Rexene Products
[2]Rextac 2535 from Rexene Products
[3]Irganox 1010 from Ciba Geigy
[4]Molsiv 3A from UOP
[5]Molsiv 13X from UOP The compositions were prepared by combining the components in a Sigma Blade mixer at a temperature of between about 120° C. to 150° C. The mixer was blanketed with dry nitrogen to prevent premature adsorption of moisture. When the mixture was homogeneous and smooth, the compositions were evacuated for 60 minutes at a vacuum level of 572 mm Hg to remove any volatiles. The compositions were then filtered and packaged into dry containers which were sealed to prevent moisture ingress.

The Examples were first tested for flexibility at −29° C. by bending a bead of the composition around a 1" mandrel. Comparative example A was found to be brittle at low temperatures due to the level of amorphous polypropylene in combination with the low level of depolymerized butyl rubber. The remaining examples exhibited suitable flexibility.

As shown in Table 1, Comparative example B exhibited unacceptable moisture capacity due to the low level of moisture absorbent.

The formulation of the present invention was tested for the ability to dry an insulating glass unit by frost point determination. The frost point is the temperature at which condensation occurs within the sealed unit. Using test method ASTM E-546, the following frost points were taken over time and compared with units which did not utilize any desiccant composition:

TABLE 2

| Time Interval | No desiccant | Invention Example |
|---|---|---|
| 1 hr. | 62° F. (17° C.) | 25° F. (−4° C.) |
| 2 hr. | 62° F. (17° C.) | 12° F. (−11° C.) |
| 6 hr. | 62° F. (17° C.) | 0° F. (−18° C.) |
| 72 hr. | 62° F. (17° C.) | −15° F. (−26° C.) |

The reduction of frost points over time for the invention example indicates that the composition effectively reduces moisture content of a sealed insulating glass unit.

The composition was then tested for exposure to humidity, heat/cold conditions, and UV light using ASTM E-773, which is an environmental performance test required by many window manufacturers. This test method measures the ingress of moisture into the interior air space by measuring the frost point after humidity exposure for specified time periods. The composition of the present invention maintained the frost point requirement of −29° C. or lower. The composition did not produce any chemical fog when evaluated. The composition showed no signs of sagging or movement when exposed to temperatures of up to 88° C.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An adsorbent containing composition for use in an insulating glass unit consisting essentially of:
   from about 8–50% by weight of a depolymerized butyl rubber containing isoprene;
   from about 0–42% by weight of a noncrystalline polyolefin;
   from about 20–50% by weight of a moisture adsorbent;
   from about 0.5–10% by weight of a volatile organic chemical adsorbent.

2. The composition of claim 1 in which said depolymerized butyl rubber is prepared from a butyl rubber polymer having a viscosity average molecular weight of from about 350,000 to 450,000.

3. The composition of claim 1 in which said depolymerized butyl rubber has a viscosity average molecular weight of from about 30,000 to 80,000.

4. The composition of claim 1 in which said noncrystalline polyolefin comprises polypropylene.

5. The composition of claim 4 in which said polypropylene is selected from the group consisting of amorphous propylene homopolymers, copolymers of ethylene and propylene, copolymers of butene and propylene, and terpolymers of ethylene, propylene and butene.

6. The composition of claim 1 in which said composition further comprises about 0.2% to 0.5% by weight of an antioxidant.

7. The composition of claim 1 in which said composition further comprises about 0.1% to 0.5% by weight of a pigment selected from the group consisting of carbon black and titanium dioxide.

8. The composition of claim 1 in which said moisture adsorbent is selected from the group consisting of molecular sieves, silica gel, silica magnesia gel, silica alumina gel, activated carbon, calcium oxide, and natural zeolites.

9. The composition of claim 1 in which said volatile organic chemical adsorbing material is selected from the group consisting of molecular sieves, activated carbon, and silica gel.

10. The composition of claim 1 having a viscosity, when measured by ASTM D2452 at 88° C., in the range of 5–25 seconds.

11. An adsorbent containing composition for use in an insulating glass unit consisting essentially of:

from about 8–50% by weight of a low molecular weight butyl rubber containing isoprene having a viscosity average molecular weight of from about 30,000 to 80,000;

from about 0–42% by weight amorphous polypropylene;

from about 20–50% by weight of a moisture adsorbent;

from about 0.5–10% by weight of a volatile organic chemical adsorbent.

* * * * *